US006270068B1

(12) United States Patent
Cracknell

(10) Patent No.: US 6,270,068 B1

(45) Date of Patent: Aug. 7, 2001

(54) TRANSPORT DEVICE

(75) Inventor: John Cracknell, West Maidenhead (GB)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/348,968

(22) Filed: Jul. 7, 1999

(30) Foreign Application Priority Data

Jul. 9, 1998 (GB) ........................................ 9814952

(51) Int. Cl.[7] .............................. B41F 13/64; B65H 5/30; B65H 29/54; B65G 49/00

(52) U.S. Cl. ......................... 270/52.26; 270/14; 198/644; 271/175

(58) Field of Search .............................. 270/52.14, 52.26; 198/644; 271/175

(56) References Cited

U.S. PATENT DOCUMENTS 1,618,591 * 2/1927 Jacobsen .......................... 270/52.26
1,973,041 * 9/1934 Birkmeyer .......................... 198/644
1,985,850 * 12/1934 Beardsley .......................... 198/644
2,006,294 * 6/1935 Beardsley .......................... 198/644
2,028,231 * 1/1936 Mann .......................... 198/644
2,028,236 * 1/1936 Needham .......................... 198/644
3,239,214 * 3/1966 Rauschenberger .......................... 198/644
4,262,897 * 4/1981 Kopacz .......................... 271/185
4,493,482 * 1/1985 Valenti et al. .......................... 270/12
4,519,599 * 5/1985 Mayer .......................... 270/52.18
4,522,384 6/1985 Beckley .
4,747,817 * 5/1988 Newsome .......................... 493/438
5,028,193 * 7/1991 Misicka .......................... 412/8
5,297,784 * 3/1994 Wagner .......................... 270/52.17
6,095,740 * 8/2000 Hollenstein et al. .......................... 412/4

* cited by examiner

*Primary Examiner*—Christopher P. Ellis
*Assistant Examiner*—Jeffrey A. Shapiro
(74) *Attorney, Agent, or Firm*—Herbert L. Lerner; Laurence A. Greenberg; Werner H. Stemer

(57) ABSTRACT

An improved transport device for transporting signatures from a continuously moving saddle chain has a first pair of belts arranged opposite to each other. A signature moving with continuously speed on a saddle chain is gripped between the pair of belts and accelerated away from the saddle chain to a working station.

14 Claims, 5 Drawing Sheets

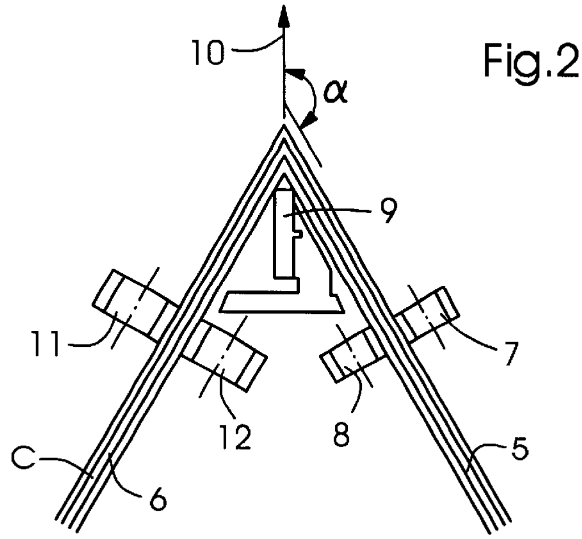
Fig.2
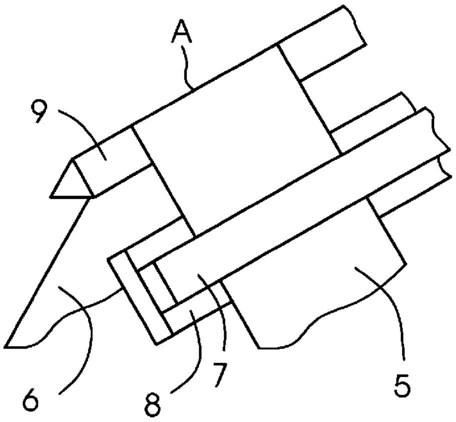
Fig.3
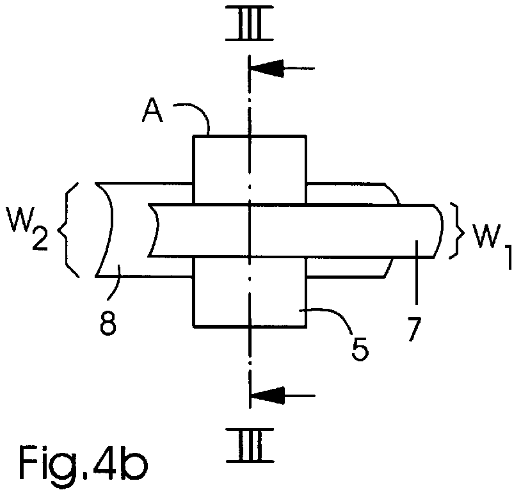
Fig.4b
Fig.4a
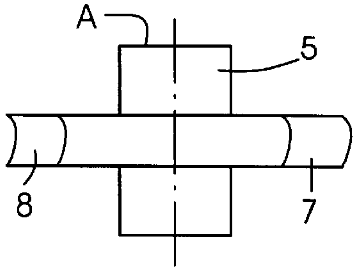

TRANSPORT DEVICE

TECHNICAL FIELD

The present invention relates to a transport device particularly to a transport device for transporting signatures moving on a saddle chain of a saddle binding machine away from the moving chain .

BACKGROUND OF THE INVENTION

For the production of bound printed products, such as books, periodicals, magazines, etc. transport and gathering devices are well known. After collating single sheets or signatures the collated bundles have to be fed by a transport device to further processing stations such as a trimming or stitching station.

A known transport device for feeding the collated signatures from a saddle chain to a further working station uses a shuttle assembly to move the signatures to a stitching station. The shuttle assembly grips the collated signature bundle and moves it to the stitching station where it is released. Then, the shuttle mechanism returns to grip the next succeeding bundle of signatures. When the shuttle mechanism engages the next bundle of signatures, it also engages the previously moved bundle of signatures located at the stitching station and moves the bundle of signatures, which in the meantime has been stitched, to the delivery station, while the next bundle of signatures is moved to the stitching station. A transfer device and a stitching machine of this general construction is known from U.S. Pat. No. 3,317,026.

The existing systems used on many saddle stitchers use a so called reciprocating gripper system. This comprises a row of grippers which, when closed, press against the outside of the book. These grippers are connected to a "backup" bar on the inside of the book, so that one half of the book is trapped between the grippers and this "backup" bar. The grippers open, in order to release the book at the stitching station and move back in their open condition. The grippers close on moving books when they start to move forward again. In this way, they accelerate the books away from the conveyer chain and stop them at the stitching position. The whole gripper and backup assembly is supported on a linear slide and driven backward and forward by a crank mechanism.

This system, however, comprises a relatively large reciprocating mass which requires heavy support frames and a lubricated slide system. When the assembly is driven from a crank, velocities cannot easily be optimized due to the fact that a crank is only capable of simple harmonic motions. Finally, as the gripper and backup bar assembly can only contact the inner half of the book, the higher speed outside of the book is uncontrolled and this tends to cause the spine of the book to move off the saddle apex during quick deceleration resulting in off-center stitching.

SUMMARY OF THE INVENTION

It is therefore an object of the present invention to provide a new and improved method of transporting and a transport device, especially for the transport of gathered signatures, from a moving chain to a work station.

The present invention is especially directed to a transport device for transporting a group or bundle of moving signatures from a saddle chain to a working station. A number of gathered signatures hanging upon one another on a saddle chain and reaching the point at which they shall be transferred to a working station enter the transport device for transporting this group of moving signatures from the saddle chain to the working station. The transport device comprises a first pair of first and second transport means arranged at a distance from each other and opposed to each other. While the signatures hang on the saddle chain, one side of the signatures enters the gap between the first and second transport means and the signature is thereby gripped by the transport mechanism. Being gripped between the first and second transport means, the signatures are accelerated away from the saddle chain by accelerating the first pair of transport means and transported to the working station. The transport means are driven by a driving mechanism which is controlled by a control mechanism coupled to the driving mechanism. Upon a signal of the control mechanism, the drive mechanism decelerates the pair of transport means and stops them when the group of signatures has reached the correct position at the working station. At this point, the transport means may open and release the signatures, preferably onto a wire clincher for the further working process. After this working process has been finished, the transport means may, if necessary, close again and accelerate the group of signatures away from the working station to a further working station or a transfer position, where the signatures are transferred to another conveying means for final working steps. At the transfer station the transport means release the signatures and the signatures are transferred to a final working station, for example, a trimmer infeed.

Preferably, each single transport means of the pair of transport means comprises belt means for transporting signatures. At the time the signatures enter the gap between the belt means, the belt means close and grip the signatures. As the belt means,comprising a pair of belts is able to move faster than the saddle chain, a first bundle of signatures reaching the transport belt means is accelerated away from the chain and stopped at the working position where the belts may open, while a following second bundle of signatures still moves continuously slow on the chain. When the first working process at the first working station is finished, the pair of belts close again and clamp the first group of gathered signatures at the first working station, as well as the following second bundle of gathered signatures which meanwhile has reached the position at which it enters the gap between the belt means. The first group of signatures is transported to a transfer position, while the second group of signatures is transported to the first working station.

In a first embodiment signatures are gathered on a moving chain hanging on the saddle chain, with a first side of the signature being on one side of the chain and a second side of the signature being on the opposite side of the chain. Upon a signal of the control means, the drive mechanism starts the pair of belts to run. As soon as the belts have reached the speed of the moving chain, the signatures enter the gap between belts and preferably there is no difference in speed between the belts and the signatures at this time. The belts then close and accelerate the signatures away from the chain. Thus, the timing of accelerating the belts and the movement of the signatures have to be synchronized. This means that the signal of the control mechanism has to start acceleration of the belts in due time, depending on the velocity of the moving chain and the acceleration of the belts. Then, the signatures are accelerated away from the saddle chain. Upon a further signal of the control means, the driving means decelerates the belts and the group of signatures is decelerated accordingly and stopped at a predetermined stop position where the working process, e. g. stitching, is to be carried out. When the belts have stopped moving forward, the belts preferably open, in order to allow the signatures to settle exactly on the clincher apex before being stitched. After stitching is complete, the belts close on stitched signatures which now can be regarded as a book and accelerate the book away from the stitching position. At the time when the belts have closed on the stitched book and when they have accelerated up to chain speed, they grip the next bundle of moving signatures from the continuously moving saddle chain as described above, accelerate it away from the chain, and feed it to the stitching station.

BRIEF DESCRIPTION OF THE DRAWINGS

Other objects and features of the invention will become apparent to those skilled in the art upon the following description of the drawings wherein:

FIG. 2 is a cross-sectional view taken from line II—II of FIG. 1.

FIG. 3 is a fragmentary schematic illustration depicting the position of the transport device with respect to the saddle chain.

FIGS. 4a and 4b are fragmentary schematic illustrations depicting different belts means.

Figure 1:
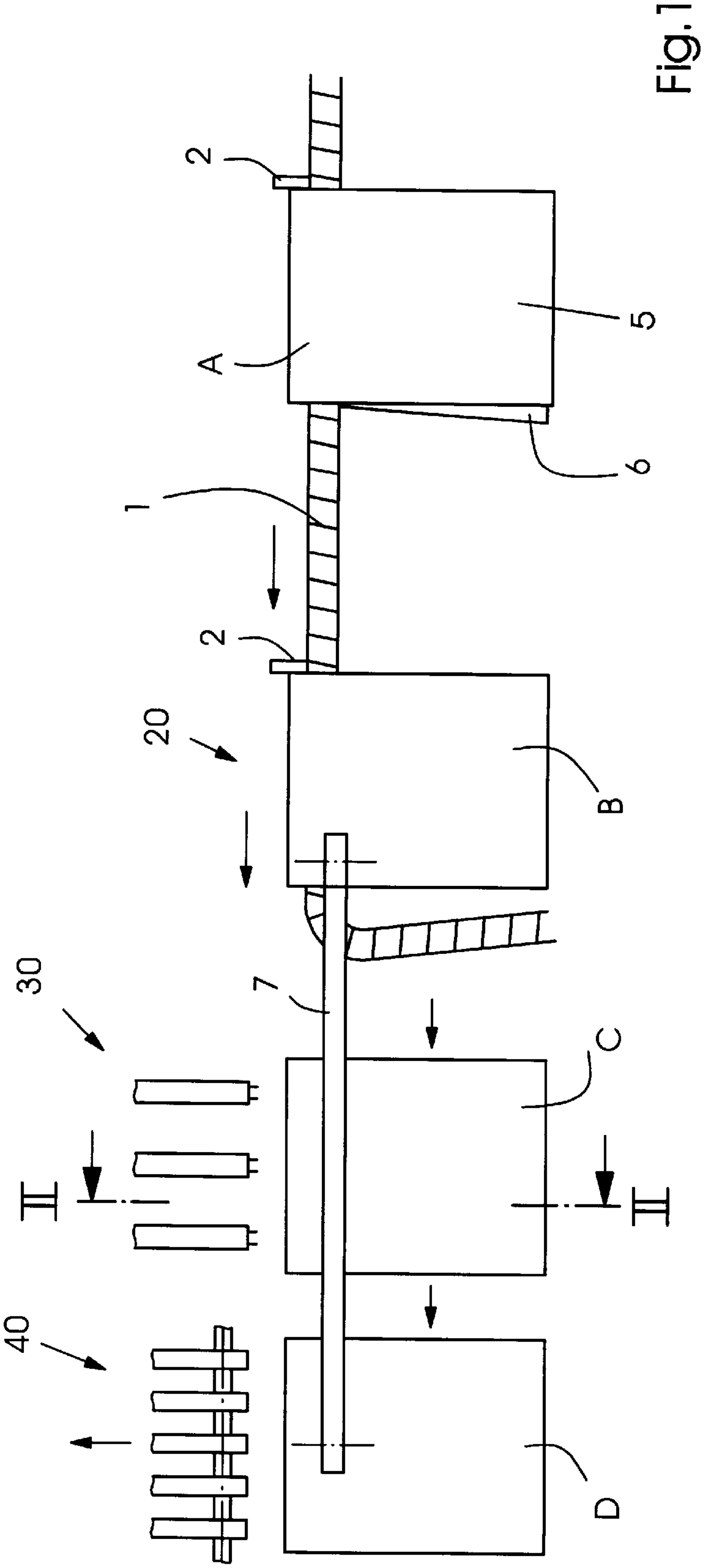
FIG. 1 is a schematic side view of a transport device in accordance with the present invention.

A schematic side view of the transport device in accordance with the present invention is shown in FIG. 1. Books A, B, C, and D are shown in FIG. 1 . These books are composed of a plurality of signatures gathered on a saddle conveyer. Books A and B are moving on the saddle conveyer chain 1 in the direction given by the arrow. Pusher fingers 2, which are mounted on the saddle conveyer chain 1, hold books A and B in a predetermined position and guaranty the movement of the books together and in accordance with the movement of the saddle conveyer chain. Books A and B are moving on the saddle chain with preferably continuous speed. The signatures of each book hang on the chain and comprise two sides. The first side 5 of the book, the so-called high folio side, hangs on one side of the chain and the second side 6, the so-called low folio side, hangs on the opposite side.

Book B has reached a position 20 at which it enters the transport device for being transported away from the chain 1 to a further working station 30. The transport device comprises an outer indexing belt 7 and an inner indexing belt 8 (FIG. 2) on the high folio side of the book. The outer and the inner indexing belts are arranged opposite to each other and may form a gap between them which is smaller than the thickness of one side of the bundle of signatures. On further movement of the saddle conveyer chain book B accordingly enters the gap between outer 7 and inner 8 indexing belt of the high folio side. At the time when book B enters this gap, the belts have already accelerated up to book speed, so that there is substantially no speed difference between the moving book B and the belts 7 and 8. The belts now close on book, speed up further, and thereby accelerate book B away from the chain 1. Book A keeps on moving on the saddle continuously slow, so that the distance between book A and B increases. Just before book B reaches the further working station 30 which in this case is a stitching station, the outer and inner indexing belts of the high folio side are in close contact with the high folio side of the book, decelerate again and stop the book from moving forward at the further working station 30. In order to allow book B to settle exactly on the clincher apex 9 (FIG. 2) before being stitched, the belts may open up again. Thereafter, the book is stitched at the wire stitching station 30. After stitching the inner and outer indexing belts on the high folio side of book B close again, clamp it, and accelerate it away from the stitching station. At the time when the pair of belts has speeded up to saddle velocity, book A enters the gap between the belts and is accelerated away from the chain as already described above with respect to book B. Being stitched, book B is normally transported to a further working station or preferably to a transfer position 40 where book B is stopped again and transferred to a trimmer infeed.

In the cross-sectional view of FIG. 2, an inner indexing belt 8 and an outer indexing belt 7 and a wire clincher 9 are shown. With respect to the normal direction 10 of the wire clincher 9, which is normally parallel to the chain, the inner indexing belt 8 and the outer indexing belt 7 are arranged at a certain angle ax where ox is within the range of 90° to 180°, preferably between 140° and 170°. Inner and outer indexing belts are arranged parallel to each other, with their belt surfaces facing each other. The arrangement of the inner and the outer indexing belt on one side of the chain, preferably on the high folio side 5, allows the transport of the book from the saddle chain to the further working station at lower speeds, that is at speeds preferably below 12.000 cph. If the transport speed is raised above this point, there is advantageously arranged a second pair of indexing belts II, 12 is arranged on the low folio side 6 of the book. The use of two pairs of belts which advantageously are coupled to the same indexing drive, i. e. one pair on one side (high folio) and one pair on the opposite side (low folio) of the book prevents the book from swinging on the saddle during acceleration and deceleration. This allows the transport of the book at speeds much higher than 12.000 cph.

In FIG. 3 a fragmentary schematic illustration of the transport device according to the invention is shown. The first side 5 of a book A consisting of plurality of collated signatures hangs on a wire clincher 9, the book having a first side 5 (high folio) and a second side 6 (low folio), the first side of the book hanging on one side of the wire clincher and the second side 6 hanging on the second side of the wire clincher. According to the invention, the first side 5 of the book is clamped between a pair of belt means comprising a first indexing belt 7 and a second indexing belt 8. As shown in FIG. 3, the first belt 7 and the second belt 8 are arranged opposite to each other, whereby the surfaces of the belts are facing each other and are at a distance from each other, which is sufficiently small to clamp the book between them. The belts 7 and 8 are arranged parallel to the direction of movement and at an angle $\alpha$ with respect to the normal direction 10 of the wire clincher 9 (FIG. 2), whereas this normal direction 10 is parallel to the normal direction of the saddle chain. Belts 7 and 8 preferably have the same width, but may also be of different widths, as shown in FIG. 3.

Referring now to FIGS. 4a and 4b, the two different belt configurations mentioned above are shown in more detail. In FIG. 4a, the first side 5 of book A is clamped between an outer belt 7 and an inner belt 8. The width of the belts is substantially the same. However, as shown in FIG. 4b, the sizes of the two belts also can be different, especially with respect to their width. In FIG. 4*b* the width $W_1$ of belt 7 is smaller than the width $W_2$ of belt 8. These different belt configurations make it possible to adjust the belt transport device to the requirements given by the material to be transported and to the speed at which the collated bundle of signatures shall be fed to the further working station.

Figure 5A:
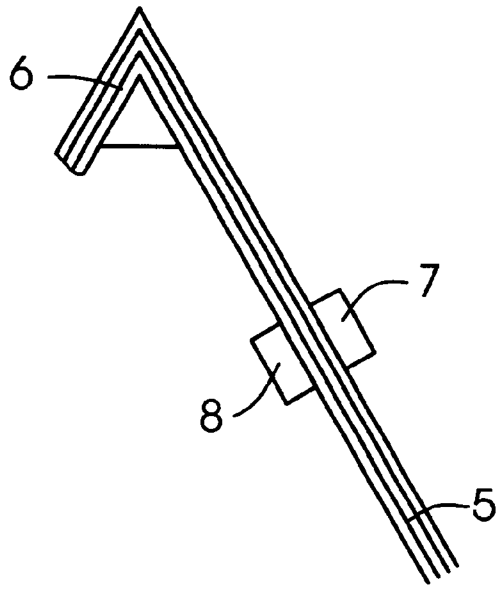
FIGS. 5a and 5b are schematic cross sectional views from line III—III of FIGS. 4a and 4b, respectively, and of two other.
Figure 5B:
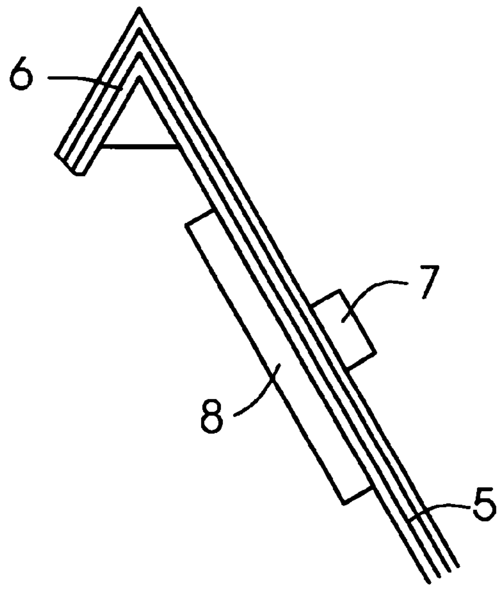
Figure 5C:
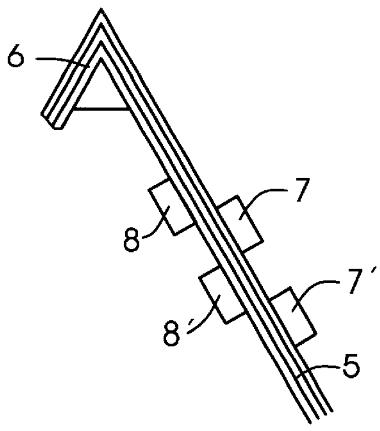
FIGS. 5c and 5d are two schematic cross sectional views of two other embodiments.

FIGS. 5*a* to 5*d* show schematic cross-sectional views on line III—III of FIG. 4*b* for different belt configurations. In FIG. 5*a*, the inner belt 8 and the outer belt 7 have substantially the same size and are arranged opposite to each other and are not offset with respect to each other, while they clamp book A between them. In FIG. 5*b*, the width of belt 7 is smaller than the width of belt 8, as already shown in FIG. 4b. Another belt configuration is shown in FIG. 5*c* where the outer belt means comprise two belts 7 and 7' and the inner belt means comprise two belts 8 and 8', the belt means being arranged opposite to each other, clamping a side 5 of a book between them and being offset with respect to each other.

Figure 5D:
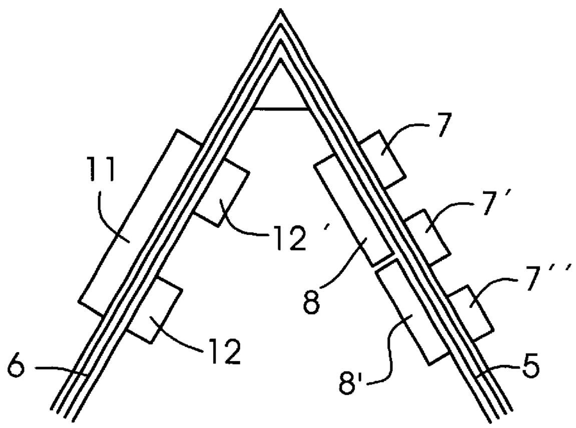

FIG. 5*d* shows a further belt configuration where the outer belt means on the high folio side 5 comprises three belts 7, 7', and 7" and opposite thereof, two belts 8 and 8' being broader than the belts 7, 7'. The high folio side 5 is clamped between the first group of belt means 7, 7', 7" and the second group of belt means 8, 8'.

Depending on the demand, all belt configurations described herein can be combined in order to optimize reliability of the transport device. As described above, it is of great advantage to use two pairs of belt means, especially when the books are to be transported with a high velocity, especially with a higher velocity than 12.000 cph. As shown in FIG. 5*d*, different belt configurations can be used on the high folio side 5 and the low folio side 6 of the signature. An outer belt 11 on the low folio side 6 is arranged opposite to two inner indexing belts 12 and 12', whereby the outer belt 11 has a width greater than the width of the opposite inner belts 12, 12', e.g. three times the width of the latter. On the high folio side the signature is gripped by three outer indexing belts 7, 7', and 7" which are arranged on the opposite side of two inner indexing belts 8 and 8', whereby the width of the first inner indexing belt 8 is, for example, twice the width of the second inner indexing belt 8'.

Figure 6:
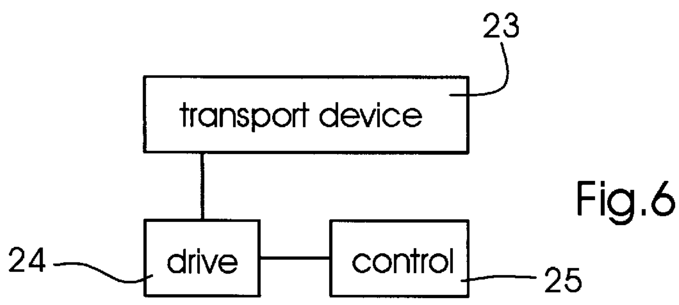
FIG. 6 is a schematic illustration depicting the drive and control mechanism of the transport device, aud

The transport device according to the invention is driven by drive means which are controlled by control means. The drive means are coupled to the transport device, which may comprise belts 7, 8, 11, or 12 and the control means 25 are coupled to the drive means as shown in FIG. 6. Upon a signal of the control means 25, which may comprise a microcomputer, the drive means 24, e. g. a motor being coupled, e. g. via an axle, to the transport device 23, is actuated and the belts of the transport device begin to run. As soon as the belts have accelerated up to the book speed, a pair of belts close on a book and the book is accelerated away from the chain and fed to the stitching station upon a signal of the control means 25 which causes the drive means 24 to speed up further. Upon a further signal of the control means 25, the drive means 24 decelerates the belts in due time before the collated signatures reach the further working station and stops the belts when the book has reached the correct position for stitching. At this time, the opening and closing mechanism of the belts may open, in order to allow the book to settle exactly on the clincher apex before being stitched. Opening and closing occurs upon further signals of the control means, which again is communicated to the drive means. After stitching, the belts close on the book again and the drive means accelerate the belts together with a clamped book, in order to feed the book to the transfer station 40. The control means 25 may additionally be coupled to sensors (not shown) for sensing the position of the books on the continuously moving chain as well as on the belt transport device. Normally these sensors are arranged along the path of the books. Further means may be provided for sensing and communicating the actual status of the working station to the control unit. Especially a "finished" signal may be communicated to the control means 25 when stitching has been completed. On the basis of these signals the control means 25 will generate a signal which is communicated to the driving means 24 and which causes the driving means 24 to accelerate or decelerate the belts, and, if necessary, to open and close the belts on the book.

Figure 7A:
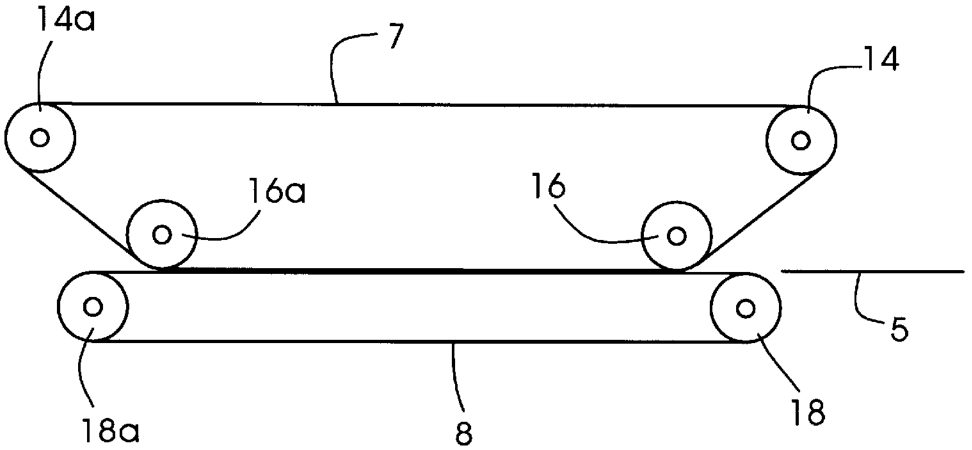
FIGS. 7a–7c are fragmentary schematic illustrations depicting the opening and closing mechanism of the belts.
Figure 7B:
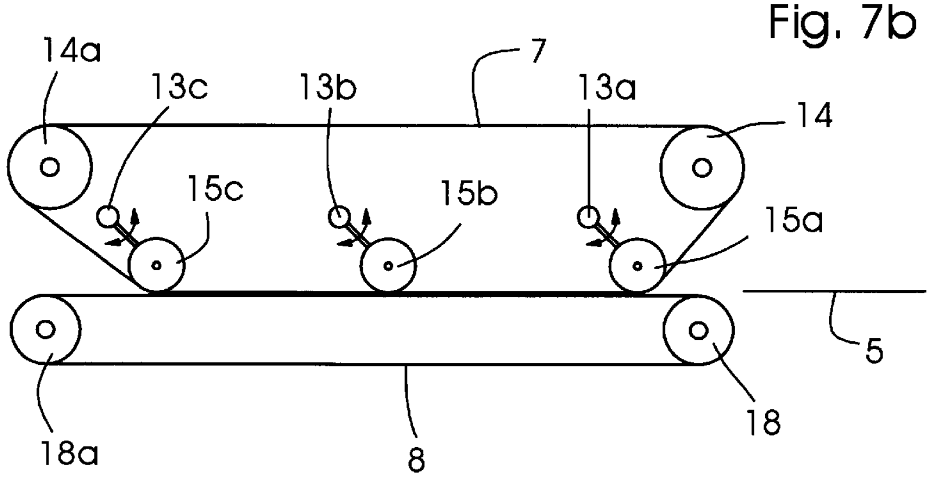
Figure 7C:
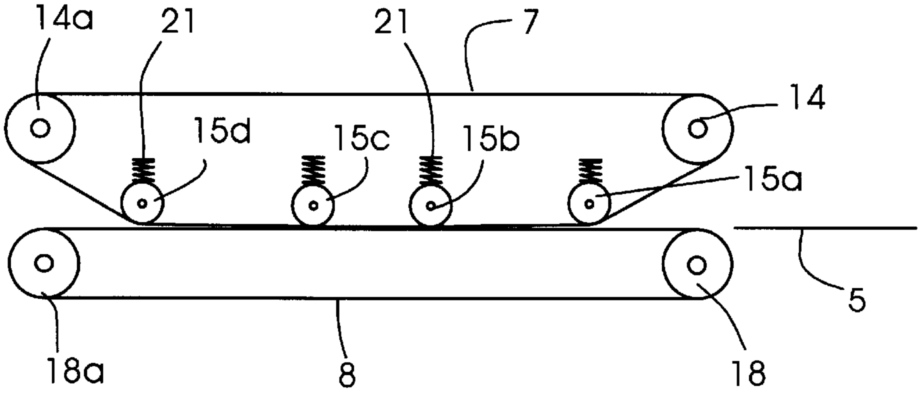

Some examples of possible opening and closing mechanisms are illustrated in FIGS. 7*a* to 7*c*. FIG. 7*a* shows a schematic view of a "passive" opening mechanism, whereby a gathered high folio book side 5 enters a fixed gap between an outer belt 7 and an inner belt 8. The path of the outer belt 7 is defined by cooperating fixed rollers 16, 14, and 16*a* and 14*a* and the gap between the belt 7 and 8 is given by the vertical distance of the rollers 16*a* and 18*a* and 16 and 18, respectively. This gap is kept narrow enough to clamp one side of the signatures between the belts. In this case no active physical opening and closing on the high folio book side 5 takes place when it enters the fixed gap between belts 7 and 8. Therefore, the high folio side 5 of a bundle of signatures enters a decreasing gap between the belts 7 and 8 and the book is accelerated away from the chain as soon as its leading edge is clamped between belts 7 and 8. The rollers 14, 16, , 14*a*, 16*a*, 18 and 18*a* are in a fixed position and define the path of the belts 7 and 8.

Referring now to FIG. 7*b*, belt 8 is moving around two fixed rollers 18 and 18*a*, the path of the belt 8 being defined by the position of these fixed rollers. Rollers 14, 14*a* are fixed in their position and rollers 15*a* to 15*c* are movable as indicated by the arrows. All of the movable rollers 15*a* to I 5*c* may, for example, be rotatable about of their respective corresponding axles 13*a* to 13*c*. To open and close the belts, the movable rollers 15*a* to 15*c* may be rotated about the corresponding axles 13*a* to 13*c*, which increases or decreases the gap between the belts 8 and 7. According to this configuration it is possible to open the outer belt 7 along its entire length upon the signal of a control unit which controls opening and closing of the belt. If the movable rollers 15*a* to 15*c* are moved simultaneously away from belt 8, the gap between the pair of belts 7, 8 increases along the entire length of belt 7. However, it is also possible to open the belts only at one or each end thereof, as shown in more detail in FIG. 7*c*. Again, the path of the inner belt 8 is defined by the position of the two fixed rollers 18 and 18*a*, whereas the path of the outer belt 7 is defined by two fixed rollers 14 and 14*a* and a plurality of movable rollers 15*a* to 15*d* which, in this case, are movable in the vertical direction via controllable springs 21. Each of the movable rollers 15*a* to 15*d* can be controlled separately in order to displace the movable rollers 15*a* to 15*d* in different amounts. In the example of FIG. 7*c*, the movable rollers 15*a* and 15*d* are displaced with respect to the movable rollers 15*c* and 15*b* in order to produce a gap at the beginning and at the end of the belts. Thus, the high folio side 5 of a book entering the gap between the pair of belts 7, 8 can easily be clamped between the belts by simply moving the displaceable roller 15*a* in the direction of the inner belt 8 and thus closing the belt when both belts have speeded up to signature speed.

Although in FIG. 7 the rollers 14, 14*a* and 18, 18*a* are described as being fixed, these rollers may also be movable, if desired. Additionally, the movable rollers 15 can be of any number, which means that the number of movable rollers 15 is not limited to three or four, as described by way of example in FIGS. 7*b* and 7*c*.

It will of course be understood that the present invention has been described above purely by way of example, and that modifications of detail can be made within the scope of the invention.

I claim:

1. A transport device especially for transporting a bundle of moving signatures, comprising:

a saddle chain;

a working station connected to said saddle chain;

the signatures hanging on the saddle chain and having first and second sides, the first side hanging on one side of the chain and the second side hanging on an opposite side of the chain; and a first pair of transport belts, having a first and second belt arranged opposite to each other for gripping and transporting the first side of the bundle of signatures between them.

2. A transport device according to claim 1, said working station having a wire clincher and said first and second belt are arranged at an angle of more than 90° and less than 180° with respect to the normal direction of a wire clincher.

3. A transport device according to claim 1, wherein said first belt of said first pair of transport belts is substantially of the same size and shape as said second belt.

4. A transport device according to claim 1, wherein said first belt of said first pair of transport belts is of different size and shape from said second belt of said first pair of transport belts.

5. A transport device according claim 1, wherein said first of said first pair of transport belts comprises two or more belts.

6. A transport device according to claim 1, wherein said first and second belt of said first pair of transport belts are movable, towards one another, in order to increase or decrease their distance from one another.

7. A transport device according to claim 1, wherein the transport device further comprises a second pair of transport belts for gripping and transporting the second side of the bundle of signatures between them, having a first and second belt arranged opposite to each other.

8. A transport device according to claim 7, the transport device further comprising a driving mechanism for driving each of the pairs of transport belts, and a control mechanism being coupled to the driving mechanism for controlling the driving belts.

9. A transport device according to claim 7, further comprising an opening and closing mechanism for moving said first and second belt of at least one of said first and second pair of driving belts from an open position in which the respective first and second belts are apart from each other into a closed position in which the respective first and second belts are closed to each other.

10. A transport device according to claim 9, wherein the opening and closing mechanism comprises movable rollers.

11. A transport device according to claim 10, wherein said rollers are movable around an axle.

12. A transport device according to claim 10, wherein said rollers are spring-loaded.

13. A saddle binding machine comprising:

a signature conveyor, a plurality of hoppers disposed at spaced apart locations along said signature conveyor;

a transport device especially for transporting a bundle of moving signatures each having a first side and a second side, including a saddle chain having an first side opposing a second side, said first side of said saddle chain supporting the first side of each signature and said second side of said saddle chain supporting the second side of each signature; a working station connected to said saddle chain; and a first pair of transport belts, having a first and second belt arranged opposite to each other for gripping and transporting the first side of the bundle of signatures between them.

14. A transport device especially for transporting a bundle of moving signatures each having a first side and a second side, comprising:

a saddle chain having a first side opposing a second side, said first side of said saddle chain supporting the first side of each signature and said second side of said saddle chain supporting the second side of each signature;

a working station connected to said saddle chain; and a first pair of transport belts, having a first and second belt arranged opposite to each other for gripping and transporting the first side of the bundle of signatures between them.

* * * * *